Nov. 19, 1929.  G. C. THOMAS, JR  1,736,020
CABLE CONNECTER
Filed July 26, 1926
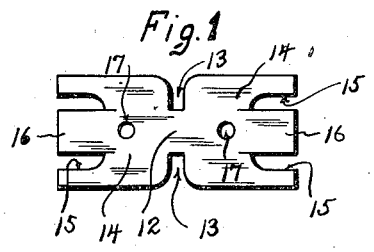
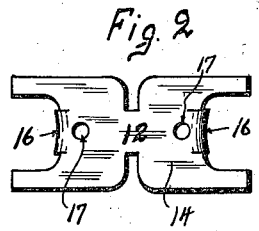
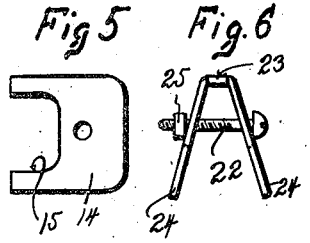
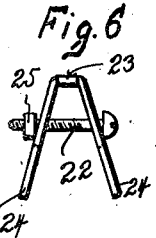
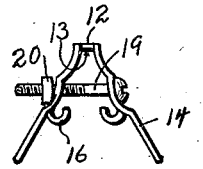
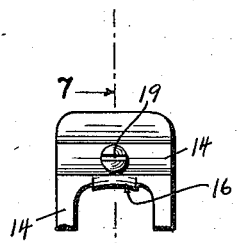
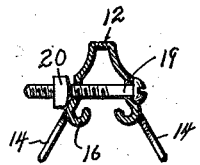
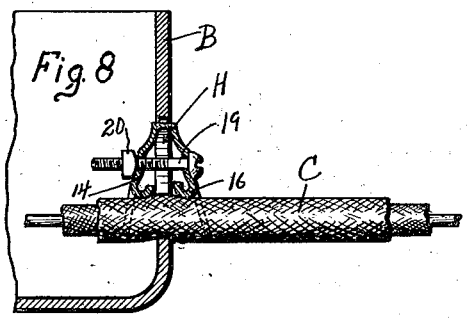
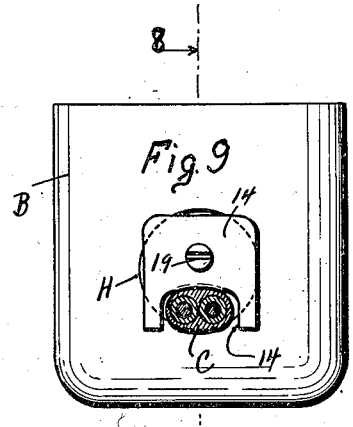
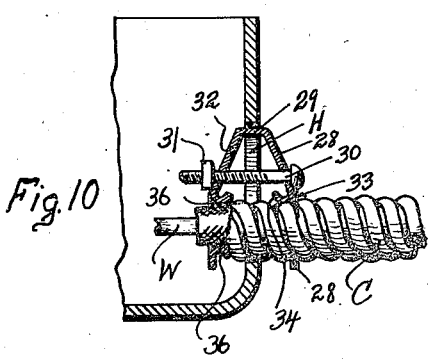
INVENTOR
George C. Thomas, Jr.
BY
ATTORNEYS Patented Nov. 19, 1929

1,736,020

UNITED STATES PATENT OFFICE

GEORGE C. THOMAS, JR., OF ELIZABETH, NEW JERSEY, ASSIGNOR TO THE THOMAS & BETTS CO., OF ELIZABETH, NEW JERSEY, A CORPORATION OF NEW JERSEY

CABLE CONNECTER

Application filed July 26, 1926. Serial No. 124,821.

This invention relates to cable and box connecting means and more particularly to a new and useful connecter to anchor cable to electric fixture boxes and the like.

An object of the invention is to produce a new type of connecter made from a single piece sheet metal stamping and including operating means such as a screw anchoring the connecter in the box and gripping the cable against the exposed box hole edge and to carry out these two functions without passing the screw through the box wall or in any way connecting it or other operating means to said box.

A further object of the invention is to produce a cable connecter in which the operating means may be disposed in the box hole thus incorporating the entire connecter within the confines of the diameter of the box hole into which the cable and connecter are placed.

With the above and other objects in view the accompanying drawings illustrate an example of the invention serving to illustrate its principle and construction.

Figure 1 shows the sheet metal blank from which the connecter is fashioned.

Figure 2 shows the first bending operation to which the blank is subjected to form a protective bearing foot on the connecter to grip against the cable.

Figures 3 and 4 illustrate a connecter in complete form with the screw or other operating means mounted thereon.

Figures 5 and 6 show the connecter in its simplest form the first view being an end elevation of the connecter after it is centrally bent, while Figure 6 shows the complete connecter.

Figure 7 illustrates a sectional view through the completed connecter as taken on the lines 7—7 of Figure 4.

Figure 8 illustrates a vertical sectional view of an electric fixture box with a cable and the connecter anchored thereto.

Figure 9 illustrates an outside elevation of the box with the connecter and cable anchored thereto.

Figure 10 shows an improved modified form of connecter including a bushing which adapts the connecter to metal armored cable.

Electric fixture boxes B are manufactured with knock-out openings or holes H to receive the cable C and connecters and by the use of my improved connecter the cable is anchored in the box and electrical wiring connections are made inside the box with the wires W coming from the cable.

Referring further to the drawings for a description of the invention, there is shown a sheet metal blank including a neck 12 to either side of which is formed box hole edge anchorage notches 13 which is an example of one suitable means for anchoring the connecter to the box hole edge. The neck 12 joins the connecter clamp legs 14, each of which is provided with a cable passage 15 on the outer free end thereof. A tongue 16 is formed centrally of the cable passage 15 and is curled up to form a smooth cable bearing foot to engage slidably against the cable.

The connecter is bent into substantially that form shown in Figures 3 and 7 thus leaving the neck 12 at the apex of the inverted V-shaped connecter having cable clamp legs which diverge from the box hole edge anchorage apex 12 and including the pressure foot or roll 16 on the lower ends thereof.

Suitable operating means are employed to draw together the cable clamp plates 14 and a screw 19 is shown for this purpose and is carried in screw holes 17, one to either side of the anchorage apex 12. One of the holes 17 may be threaded if desired while the screw 19 is mounted freely in the other screw hole, but a nut 20 may be used to draw in on the diverging ends by which to close the connecter and grip the cable and to anchor the apex 12 in the box hole edge H.

The connecter in its simplest form comprises a V-shaped part, but after completion with the screw 22 mounted therein it assumes the form of the letter A with box hole edge engaging or anchorage notches 23 formed on the upper end thereof and with outwardly diverging legs 24. The screw 22 carries a nut 25 by which the cable clamp legs 24 are drawn together. In this form of the connecter, the cable bearing feet 16 are omitted and this connecter is suitable for certain kinds of work.

The connecter is mounted in the box as shown in Figures 8 and 9 with the screw 19 loosened up from the nut 20 so as to permit the cable clamp legs 14 to be spread outwardly and apart thus permitting the cable C to be passed through the passages 15 and through the box hole H. The screw 19 is now run up to tightened position and the nut 20 bears against the cable clamp leg 14 serving to draw both diverging portions inwardly which increasingly presses on the cable and causes the cable wall to be gripped and pressed into that part of the exposed box hole edge which is opposite the box hole edge in registry with the anchorage notches 13. The clamp legs 14 receive the cable C by reason of the passage 15 and the outer ends of the members 14 may be made in the formation of a fork if desired so as to readily admit the cable.

Figure 10 shows a modified form of the invention particularly adapted to armored cable wherein the downwardly diverging cable clamp legs 28 and 32 diverge from the apex anchorage neck 29. The neck 29 is seated firmly against the box hole edge by reason of notches similar to those designated by numeral 13 in Figure 1. A screw or bolt 30 is threaded through the cable clamp legs 28 and 32 which may be provided with a nut 31 if that construction is desired. The lower end of one clamp leg 28 is provided with a cable passage 33 together with a pressure foot 34 to slidably bear against the cable C.

It is usually desirable to employ bushings where metal armored cable is used and to this end one of the cable clamp legs has a bushing 36 formed on the lower end thereof. The bushing 36 forms a stop against which the ragged end of the cable abuts or comes to rest and protectively guides the wires W which pass through the bushing 36 to make electrical connections inside of the box B. The screw or bolt 30 is tightened up to draw the cable clamp legs 28 and 32 inwardly thereby causing the foot 34 and bushing 36 to press against the cable C and force it to be gripped by the exposed box hole edge H.

Referring generally to all forms of the invention, the screw or bolt employed in connection with the above described connecter is mounted in substantial parallel relation to the cable C and within the box hole H. It may be operated by a screw driver working from either side of the box simply by properly mounting the bolt 30 in the direction desired in the connecter shown in Figure 10, or by reversing the direction of the connecter itself shown in the other views.

The connecter leg portions 14 are made sufficiently narrow to admit the connecter into the box hole or at least one of the portions 14, on one side or the other of the anchorage apex, is made narrow enough for that purpose so as to bring the anchorage means 13 into registry with the box hole edge, whereupon the screw draws together the diverging clamp legs to simultaneously grip the cable and anchor the connecter in the box.

What I claim is:

1. A cable connecter comprising a flat plate part bent in the general form of the letter V, the apex of which includes box hole edge anchorage means to engage the edge of a box hole and the diverging ends of which are adapted to stand out to either side of the box wall and engage a cable, and operating means to draw the ends together.

2. A cable connecter comprising a flat plate part bent in the general form of the letter V, the apex of which includes box hole edge anchorage means to engage the edge of a box hole and the diverging ends of which are adapted to stand out to either side of the box wall and engage a cable, and a screw mounted in the connecter to draw its ends together.

3. A cable connecter bent into the form of an inverted V from a single part, and having a cable passage, box hole edge anchorage means included on its apex, and operating means to draw together the diverging portions.

4. A cable connecter bent into the form of an invented V from a single part, and having a cable passage, box hole edge anchorage means included on its apex, and a screw mounted in the connecter to draw together the diverging portions.

5. A cable connecter comprising a single stamping bent centrally to form an apex including box hole edge anchorage means, and including two cable clamp legs diverging at an angle from the apex, a cable clamp foot formed on each free end to bear on a cable, and operating means to draw the clamp legs together.

6. A cable connecter comprising a single stamping bent centrally to form an apex including box hole edge anchorage means, and including two cable clamp legs diverging at an angle from the apex, a bushing formed on the end of one clamp leg through which wires are protectively guided, a cable passage included on the other leg, and operating means to pull the legs together.

7. A cable connecter comprising a V-shaped member, box hole anchorage means at the apex of the V, to engage the edge of a box hole and the diverging ends of the V being adapted to stand out on either side of the box wall and engage a cable, and operating means to draw the ends together.

8. A cable connecter comprising a bent V-shaped member, box hole anchorage means at the apex of the V, to engage the edge of a box hole and the diverging ends of the V being adapted to stand out on either side of the box wall and engage a cable, and operating means to draw the ends together.

9. A cable connecter comprising a V- shaped member, the diverging ends of which are adapted to stand out on either side of the box wall and engage a cable, notches in the apex of said V to engage the edge of a box hole, and operating means to draw the ends of the V-shaped member together.

10. A cable connecter comprising a single stamping bent centrally to form an apex including box hole edge anchorage means, and including two cable clamp legs diverging at an angle from the apex, a cable clamp foot on each free end to bear on a cable, said cable clamp foot being formed by bending inwardly a portion of the cable clamp ends and operating means to draw the clamp legs together.

In testimony whereof I affix my signature.

GEORGE C. THOMAS, Jr.